US009722708B2

(12) United States Patent
Sarashina

(10) Patent No.: US 9,722,708 B2
(45) Date of Patent: Aug. 1, 2017

(54) OPTICAL TRANSMITTER, SUBSCRIBER SIDE DEVICE, AND LIGHT SOURCE TEMPERATURE CHANGE SUPPRESSION METHOD

(71) Applicant: Oki Electric Industry Co., Ltd., Tokyo (JP)

(72) Inventor: Masahiro Sarashina, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 63 days.

(21) Appl. No.: 14/996,350

(22) Filed: Jan. 15, 2016

(65) Prior Publication Data
US 2016/0248520 A1 Aug. 25, 2016

(30) Foreign Application Priority Data

Feb. 20, 2015 (JP) ................................. 2015-032204

(51) Int. Cl.
*H04B 10/00* (2013.01)
*H04J 14/00* (2006.01)
(Continued)

(52) U.S. Cl.
CPC ........ *H04B 10/572* (2013.01); *H04J 14/0282* (2013.01)

(58) Field of Classification Search
CPC .. H04B 10/572; H04B 10/564; H04B 10/116; H04J 14/0282; H04J 14/0221
See application file for complete search history.

(56) References Cited

U.S. PATENT DOCUMENTS 6,947,458 B2 * 9/2005 Moriarty ............... H01S 5/0687
372/38.01
8,073,344 B2 * 12/2011 Pruszenski ........... H04B 10/572
398/203
(Continued)

FOREIGN PATENT DOCUMENTS

JP 2011-082908 A 4/2011
JP 2011-135280 A 7/2011

OTHER PUBLICATIONS

Hideyuki Iwamura et al., "A Study on Extinction Ratio of Upstream Burst Signals for λ.-tunable WDM/TDM-PON", General Conference of the Institute of Electronics, Information and Communication Engineers, B-8-41, Mar. 2013.
(Continued)

Primary Examiner — Tesfaldet Bocure
(74) Attorney, Agent, or Firm — Rabin & Berdo, P.C.

(57) ABSTRACT

An optical signal generation section and a transmitter control section are provided. The optical signal generation section includes a light source, a temperature adjuster that adjusts a temperature of the light source, and a light amplifier that amplifies light generated by the light source and generates burst signals. The transmitter control section includes a temperature change suppresser that sends a temperature suppression signal to the temperature adjuster, the temperature suppression signal reporting a temperature suppression amount that is to suppress a temperature change of the light source caused by burst signal generation at the light amplifier. The temperature adjuster receives the temperature suppression signal at least a duration that the temperature adjuster requires for temperature adjustment before a timing at which the light amplifier is to generate a burst signal.

4 Claims, 8 Drawing Sheets

(51) Int. Cl.
*H04B 10/572* (2013.01)
*H04J 14/02* (2006.01)

(56) References Cited

U.S. PATENT DOCUMENTS

| | | | |
|---|---|---|---|
| 9,148,226 B2 * | 9/2015 | Sato | H04B 10/40 |
| 2001/0040719 A1 * | 11/2001 | Okuno | H01S 3/1301 |
| | | | 359/334 |
| 2009/0080904 A1 * | 3/2009 | Nakamoto | H04B 10/572 |
| | | | 398/183 |
| 2014/0050238 A1 * | 2/2014 | Kakui | H01S 3/2308 |
| | | | 372/25 |
| 2016/0013869 A1 * | 1/2016 | Teranishi | H04B 10/60 |
| | | | 398/210 |

OTHER PUBLICATIONS

Hideyuki Iwamura et al., "Characteristic Evaluation of Multiplexing Upstream Burst Signals by Using WDM/TDM-PON Prototype Transceiver", Society Conference of the Institute of Electronics, Information and Communication Engineers, B-8-26, Sep. 2013.
Tatsuro Kurobe et al., "Development of Full-Band Tunable Laser", Bulletin from Furukawa Electric Co., Ltd., vol. 121, Mar. 2008.

* cited by examiner

OPTICAL TRANSMITTER, SUBSCRIBER SIDE DEVICE, AND LIGHT SOURCE TEMPERATURE CHANGE SUPPRESSION METHOD

CROSS-REFERENCE TO RELATED APPLICATION

This application is based on and claims priority under 35 USC 119 from Japanese Patent Application No. 2015-032204 filed on Feb. 20, 2015, which is incorporated by reference herein.

BACKGROUND

Technical Field

The present invention relates to an optical transmitter that can be used as an optical transmission section of a subscriber side device, and to a light source temperature change suppression method in which the optical transmitter is provided.

Related Art

A communications network that links a building (a station) belonging to a communications business with subscriber homes is referred to as an access network. Recently, optical access networks that can handle increasing communication volumes and transfer huge amounts of information across access networks by using optical communications have been becoming common.

One type of optical access network is the passive optical network (PON). A PON has a configuration that is equipped with an optical splitter between a single station side device (optical line terminal (OLT)) provided at a station and plural subscriber side devices (optical network units (ONUs)) provided at respective subscriber homes. The OLT and ONUs are connected with the optical splitter by optical fibers.

A single-core optical fiber is used for the connection between the OLT and the optical splitter. This single-core optical fiber is split by the optical splitter and shared by the plural ONUs. Optical splitters are cheap, passive components. Thus, PONs are economically excellent and easy to maintain. Accordingly, the introduction of PONs is proceeding rapidly.

In a PON, signals sent from ONUs to the OLT (which may hereinafter be referred to as "upstream optical signals") are combined by the optical splitter and transmitted to the OLT. Meanwhile, signals sent from the OLT to the ONUs (which may hereinafter be referred to as "downstream optical signals") are separated by the optical splitter and transmitted to the respective ONUs. In order to prevent interference between the upstream optical signals and the downstream optical signals, respectively different wavelengths are assigned to the upstream optical signals and the downstream optical signals.

Various multiplexing technologies are employed in PONs. The multiplexing technologies employed in PONs include time division multiplexing (TDM) technologies in which short time slots on the time axis are assigned to respective subscribers, wavelength division multiplexing (WDM) technologies in which different wavelengths are assigned to respective subscribers, code division multiplexing (CDM) technologies in which different codes are assigned to respective subscribers, and so forth.

Of these multiplexing technologies, TDM is employed in TDM-PONs, which are currently particularly widely used. In a TDM-PON, time division multiple access (TDMA) is used. TDMA is a technology in which the OLT administers transmission timings of the ONUs and performs control such that upstream optical signals from different ONUs do not collide. The ONUs use assigned time slots on the time axis, with transmission timings specified by the OLT, and transmit upstream optical signals in bursts (burst signals).

Among PON systems, systems that employ Ethernet (registered trademark) technology are referred to as Ethernet-PON, and systems that employ Gigabit ($1 \times 10^9$ bits/s) Ethernet (registered trademark) are referred to as GE-PON. A GE-PON conforms to, for example, IEEE 802.3ah, IEEE 802.3av or the like.

A PON that combines TDM and WDM (which may hereinafter be referred to as a TDM/WDM-PON) has been proposed (for example, see Japanese Patent Application Laid-Open (JP-A) Nos. 2011-82908 (Patent Reference 1) and 2011-135280 (Patent Reference 2)). In an example of a TDM/WDM-PON, the OLT includes a plural number of terminal devices (optical subscriber units (OSU)).

In the TDM/WDM-PON, respectively different transmission wavelengths are assigned to the OSUs. The OSUs transmit downstream optical signals with the assigned transmission wavelengths. Meanwhile, the ONUs transmit upstream optical signals at transmission wavelengths and transmission timings notified to the ONUs by downstream optical signals from the OSUs with which the ONUs are registered.

In the TDM/WDM-PON, because communications are performed at wavelengths corresponding to the OSUs, the wavelengths at which ONUs transmit and receive are variable. Therefore, a reception section of each ONU is provided with a wavelength-variable filter. Thus, a reception wavelength for downstream optical signals is variable. In addition, a transmission section of each ONU is provided with an optical transmitter in which the wavelength is variable. Thus, the wavelength of upstream optical signals to be transmitted is variable.

It is sufficient that an ONU be registered with any of the plural OSUs. Therefore, in a TDM/WDM-PON, the ONUs to be administered may be divided up between and administered by the plural OSUs. An OLT may manage the numbers of ONUs corresponding with the respective OSUs in accordance with communication conditions (for example, traffic conditions and suchlike) by performing dynamic wavelength allocation (DWA).

Because of these features, in a TDM/WDM-PON, a larger number of ONUs may be accommodated by an OLT than heretofore. In a TDM/WDM-PON accommodating a large number of ONUs, in order to avoid collisions between the upstream optical signals transmitted by the respective ONUs (which are burst signals), the burst signals must be generated with a large extinction ratio (General Conference of the Institute of Electronics, Information and Communication Engineers, March 2013, B-8-41, Iwamura et al. (Non-patent Reference 1)).

As optical transmitters that generate burst signals with large extinction ratios, optical transmitters equipped with an optical amplifier such as, for example, a semiconductor optical amplifier (SOA) or the like have been proposed (Society Conference of the Institute of Electronics, Information and Communication Engineers, September 2013, B-8-26, Iwamura et al. (Non-patent Reference 2)). In an SOA, there is a large difference in light output level between On-operation times and Off-operation times. An optical transmitter according to Non-patent Reference 2 generates burst signals with a large extinction ratio by utilizing this characteristic of an SOA.

As mentioned above, an optical transmitter provided at an ONU in a TDM/WDM-PON is configured with a variable transmission wavelength. As a structure that can vary a transmission wavelength, a structure is known that employs a laser diode (LD) array as a light source of the optical transmitter. An LD array includes plural LDs specified with respectively different wavelengths. The optical transmitter selects an LD with a wavelength corresponding to an OSU that is administering the ONU in response to a command from an ONU-MAC (media access control). In addition, the LD array can be temperature-adjusted by a thermo-electric cooler (TEC). Thus, the wavelength of the upstream optical signals is determined by which LD is selected and by temperature adjustment by the TEC.

Output light from the LD array is a continuous wave (CW). Burst signals are generated from the output light of the LD array by an optical amplifier such as the above-mentioned SOA or the like.

The SOA turns on at a burst signal generation timing commanded by the ONU-MAC and amplifies the output light of the LD array. The SOA turns off after a period corresponding to the duration of the burst signal that is to be generated. Thus, the burst signals are generated in bursts from the output light of the LD array by on/off operation of the SOA. Burst signal generation timings commanded by the ONU-MAC correspond with burst signal transmission timings designated by the OSU. The burst signals generated by the SOA are modulated with data at a modulator and transmitted to the OSU.

The wavelength of the burst signals outputted from the optical transmitter is monitored by a wavelength monitor. On the basis of monitoring results, the wavelength of the burst signals may be corrected by temperature adjustments by the TEC and may be kept within a certain range.

When an optical transmitter is installed in an ONU, it is preferable if the respective structural elements of the optical transmitter are integrated onto a single chip, with a view to lowering costs, reducing power consumption, reducing size of the ONU and the like. Examples of an optical transmitter integrated onto a single chip include an optical transmitter in which an LD array, an optical coupler, an SOA and so forth structuring an optical transmitter are integrated onto a 500 μm×2600 μm chip (bulletin from Furukawa Electric Co., Ltd., volume 121, March 2008 (Non-patent Reference 3)).

During On operations, an SOA heats up. Therefore, the temperature of the SOA rises and falls in association with On/Off operations.

In an optical transmitter that is integrated on a chip, the distance between an LD array and an SOA is short. Therefore, rises and falls in the temperature of the SOA affect the LD array. As a result, temperature changes occur at the LD array. As mentioned above, the SOA performs On/Off operations in accordance with burst signal generation timings. Therefore, temperature rises and falls of the SOA occur at the burst signal generation timings. Hence, temperature changes also occur at the LD array at the burst signal generation timings. These temperature changes at the LD array cause wavelength fluctuations in the burst signals that are transmitted. If wavelength fluctuations occur in burst signals in a TDM/WDM-PON in which the transmission wavelengths of ONUs are specified in accordance with the OSUs administering the ONUs, stability of the system deteriorates. For example, if a spacing between the transmission wavelengths of respective ONUs specified by the respective OSUs administering the ONUs is 0.8 nm, then wavelength fluctuations of the burst signals must be kept to less than 0.8 nm.

The duration of a burst signal is short, being tens of microseconds. In contrast, a duration of several seconds is required for temperature adjustment by a TEC. Therefore, if temperature adjustment by a TEC starts after a temperature change caused by the generation of a burst signal has occurred, the temperature adjustment cannot correct wavelength fluctuations in the burst signal.

SUMMARY

An objective of this invention is, with an optical transmitter that uses an optical amplifier such as an SOA or the like to generate burst signals, to provide an optical transmitter that suppresses temperature changes of a light source caused by the generation of burst signals.

In order to achieve the object described above, an optical transmitter according to the present invention is provided with the following characteristics.

The optical transmitter according to the invention is an optical transmitter to be used as an optical transmission section at an ONU that is used in an optical access network, the optical transmitter including an optical signal generation section and a transmitter control section.

The optical signal generation section includes: a light source; a temperature adjuster that adjusts a temperature of the light source; and a light amplifier that amplifies light generated by the light source and generates burst signals.

The transmitter control section includes a temperature change suppresser. The temperature change suppresser sends a temperature suppression signal to the temperature adjuster, the temperature suppression signal reporting a temperature suppression amount that is to suppress a temperature change of the light source caused by burst signal generation at the light amplifier.

The temperature adjuster receives the temperature suppression signal at least a duration that the temperature adjuster requires for temperature adjustment before a timing at which the light amplifier is to generate a burst signal.

In an optical transmitter according to the invention, the temperature change suppresser receives the temperature suppression signal before a burst signal generation timing by at least a duration required for temperature adjustment. Therefore, the temperature adjuster may complete a temperature adjustment corresponding to the temperature suppression amount in time for the burst signal generation timing. As a result, temperature changes caused by on/off operations of a light amplifier during burst signal generation may be suppressed.

DETAILED DESCRIPTION

Herebelow, an embodiment of the invention is described with reference to the attached drawings. Positional relationships of the structural elements are illustrated only in outline to the extent that the invention may be understood. Moreover, an example of a preferable configuration of the invention is described; numerical conditions and the like are merely preferable examples. Thus, the invention is not limited by the embodiment described below; numerous modifications and improvements that do not depart from the structural gist of the invention and are capable of achieving the effect of the invention may be applied.

TDM/WDM-PON

Figure 1:
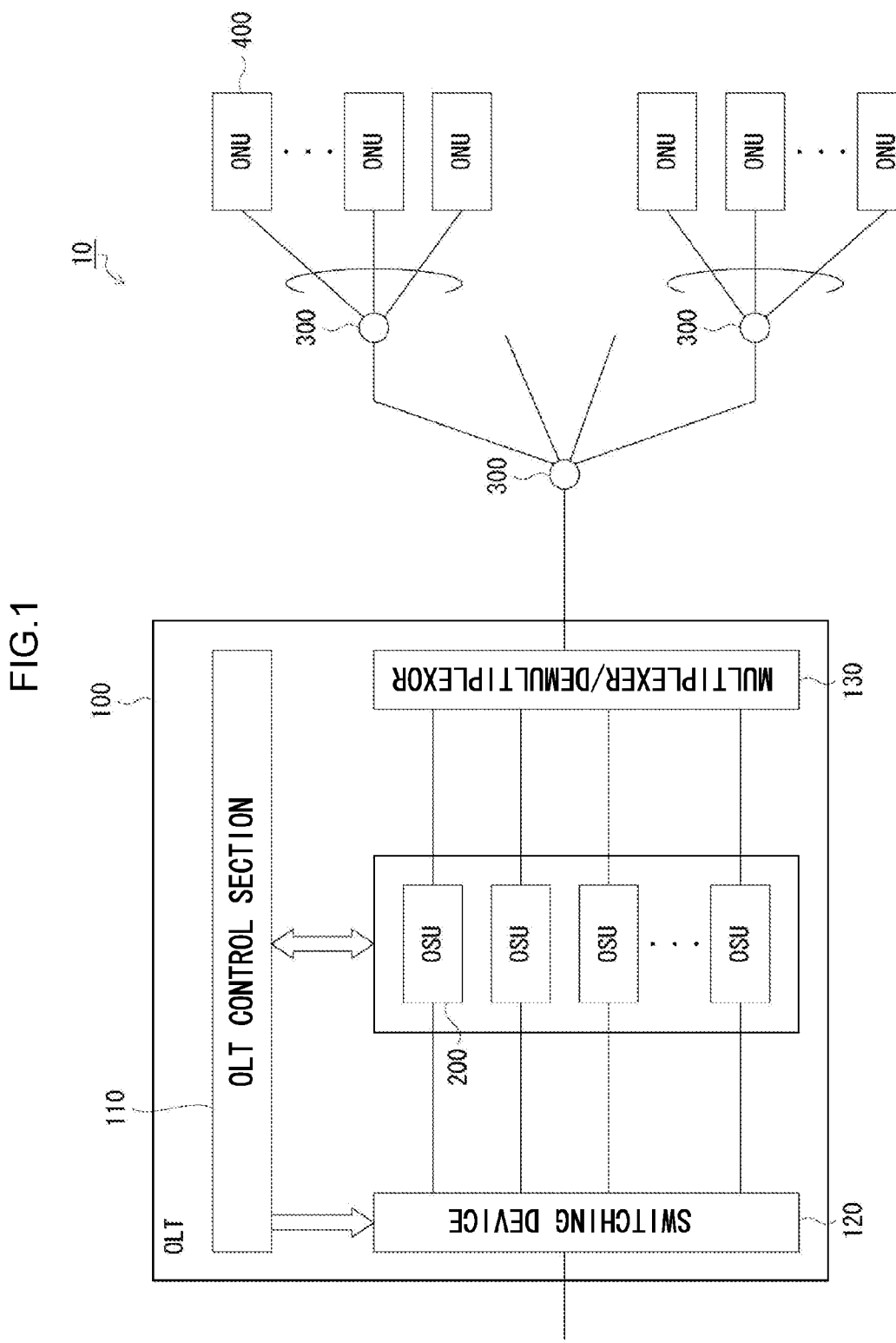
FIG. 1 is a schematic diagram of a TDM/WDM-PON.

An optical transmitter according to the present embodiment is used as, for example, an optical transmission section of an ONU included in a TDM/WDM-PON or the like. Accordingly, a configuration of the TDM/WDM-PON is described first, referring to FIG. 1. FIG. 1 is a schematic diagram of the TDM/WDM-PON.

A TDM/WDM-PON 10 includes an OLT 100, a plural number of ONUs 400, and a plural number of optical couplers 300. The OLT 100 includes an OLT control section 110, a switching device 120, a plural number of OSUs 200, and a multiplexer/demultiplexor 130. The plural OSUs 200 are connected by an optical fiber to a single optical coupler 300. The plural ONUs 400 are connected by optical fibers to respective optical couplers 300. The optical couplers 300 are connected together by optical fibers.

The ONUs 400 generate upstream optical signals, including upstream data received from user terminals and upstream control signals that conduct bandwidth requests and the like, and transmit the upstream optical signals to the OSUs 200.

The OSUs 200 generate downstream optical signals, including downstream data received from a higher level network and downstream control signals for administering the ONUs 400, and transmit the downstream optical signals to the ONUs 400.

In the TDM/WDM-PON 10, it is sufficient for each ONU 400 to be registered at one of the plural OSUs 200.

In the TDM/WDM-PON 10, respectively different wavelengths are assigned to the OSUs 200. Each OSU 200 transmits downstream optical signals with the assigned wavelength and receives upstream optical signals with the assigned wavelength.

Correspondingly, each ONU 400 transmits upstream optical signals at the wavelength that the OSU 200 with which the ONU 400 is registered is capable of receiving. Respectively different transmission timings are assigned to the ONUs 400 that are registered with the same OSU 200, such that upstream optical signals do not coincide with upstream optical signals from others of the ONUs 400 that are registered with the same OSU 200. Each ONU uses assigned timeslots on the time axis with transmission timings commanded by the OLT and transmits upstream optical signals in bursts (burst signals).

The ONUs 400 of the TDM/WDM-PON 10 are shared out between and administered by the plural OSUs 200. Traffic at the OSUs 200 may be equalized by performing DWA in accordance with traffic at the respective OSUs 200. Consequently, service bandwidths that are provided to subscribers may be increased.

The OLT control section 110 administers information of the ONUs 400 registered with the respective OSUs 200 (PON link information). The OLT control section 110 reads, writes and flexibly stores the PON link information in a memory section (not shown in the drawings) such as a random access memory (RAM) or the like. The OLT control section 110 creates a transmission plan on the basis of information such as destinations for downstream data received through the switching device 120, traffic levels and the like, and the PON link information. The OLT control section 110 reports the transmission plan to the switching device 120 and to the OSUs 200.

The OLT control section 110 adjusts numbers of the ONUs 400 that are administered by the respective OSUs 200 by DWA, assigning the OSUs 200 to administer the ONUs 400.

The switching device 120 specifies communication paths between the high-level network and the OSUs 200. On the basis of the transmission plan reported from the OLT control section 110, the switching device 120 assigns and sends downstream data to the OSUs 200, and sends upstream data that is sent from the OSUs 200 to the high-level network. Information such as the destinations of downstream data sent from the high-level network, traffic levels and the like are reported to the OLT control section 110.

The multiplexer/demultiplexor 130 multiplexes downstream optical signals with respectively different wavelengths that are sent from the OSUs 200, and sends the signals to the ONUs 400. The multiplexer/demultiplexor 130 also demultiplexes wavelength-multiplexed, time-multiplexed upstream optical signals that are sent from the ONUs 400 into the respective wavelengths, and sends the signals to the OSUs 200 corresponding to these wavelengths.

ONU

Figure 2:
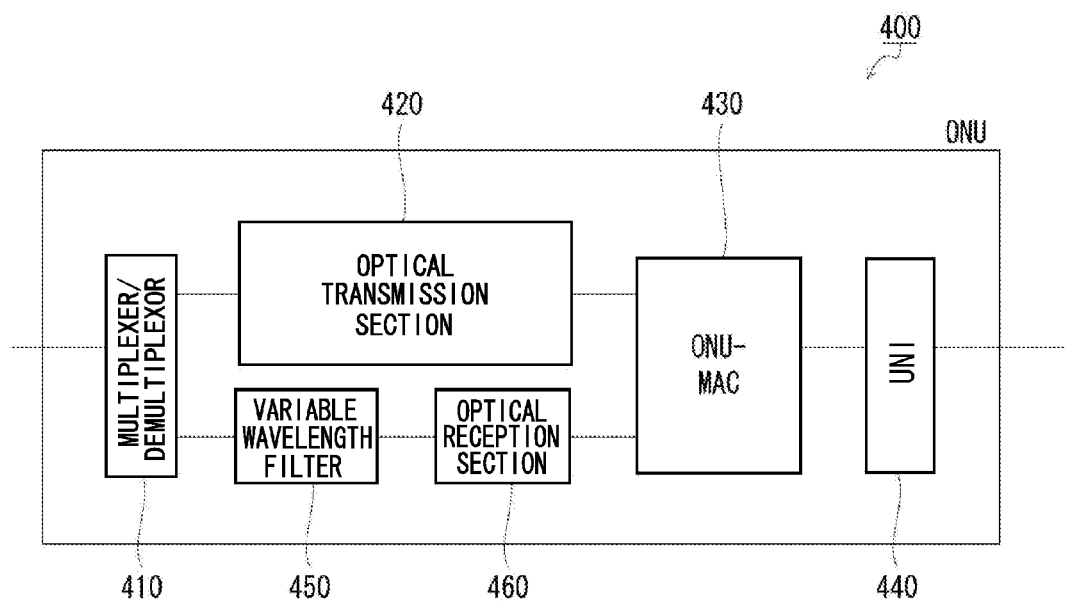
FIG. 2 is a schematic diagram of an ONU in accordance with the present invention.

Referring to FIG. 2, an ONU according to the present embodiment of the invention is described. FIG. 2 is a schematic diagram of the ONU.

Each ONU 400 is provided with a multiplexer/demultiplexor 410, an optical transmission section 420, an ONU-MAC 430, a user network interface (UNI) 440, a variable wavelength filter 450 and an optical reception section 460.

The multiplexer/demultiplexor 410 multiplexes and demultiplexes upstream optical signals and downstream optical signals. The multiplexer/demultiplexor 410 sends upstream optical signals received from the optical transmission section 420 to an OSU, and sends downstream optical signals received from the OSU to the variable wavelength filter 450. The multiplexer/demultiplexor 410 is provided with an arbitrary favorable multiplexer/demultiplexer such as, for example, a wave division multiplexing (WDM) filter or the like.

The optical transmission section 420 generates upstream optical signals in bursts (burst signals) with a wavelength corresponding to the OSU to which the ONU 400 is transmitting, and sends the burst signals to the multiplexer/demultiplexor 410. The wavelength of the burst signals is set in accordance with commands from the ONU-MAC 430.

Details of the configuration of the optical transmission section 420 are described below.

The ONU-MAC 430 performs overall control of the ONU 400. The ONU-MAC 430 sends burst signal generation timings (burst timings) and information on wavelengths and the like to the optical transmission section 420.

The UNI 440 is an interface for connection with a user terminal. The UNI 440 implements, for example, Ethernet (registered trademark) PHY or the like.

The variable wavelength filter 450 is a wavelength filter that transmits light with a predetermined transmission wavelength. The transmission wavelength may be altered.

The optical reception section 460 is included at a stage succeeding the variable wavelength filter 450. The optical reception section 460 sends downstream optical signals received via the variable wavelength filter 450 to the ONU-MAC 430 and the UNI 440. The optical reception section 460 is equipped with light detection elements such as, for example, photodiodes (PD) or the like.

Optical Transmitter

Figure 3:
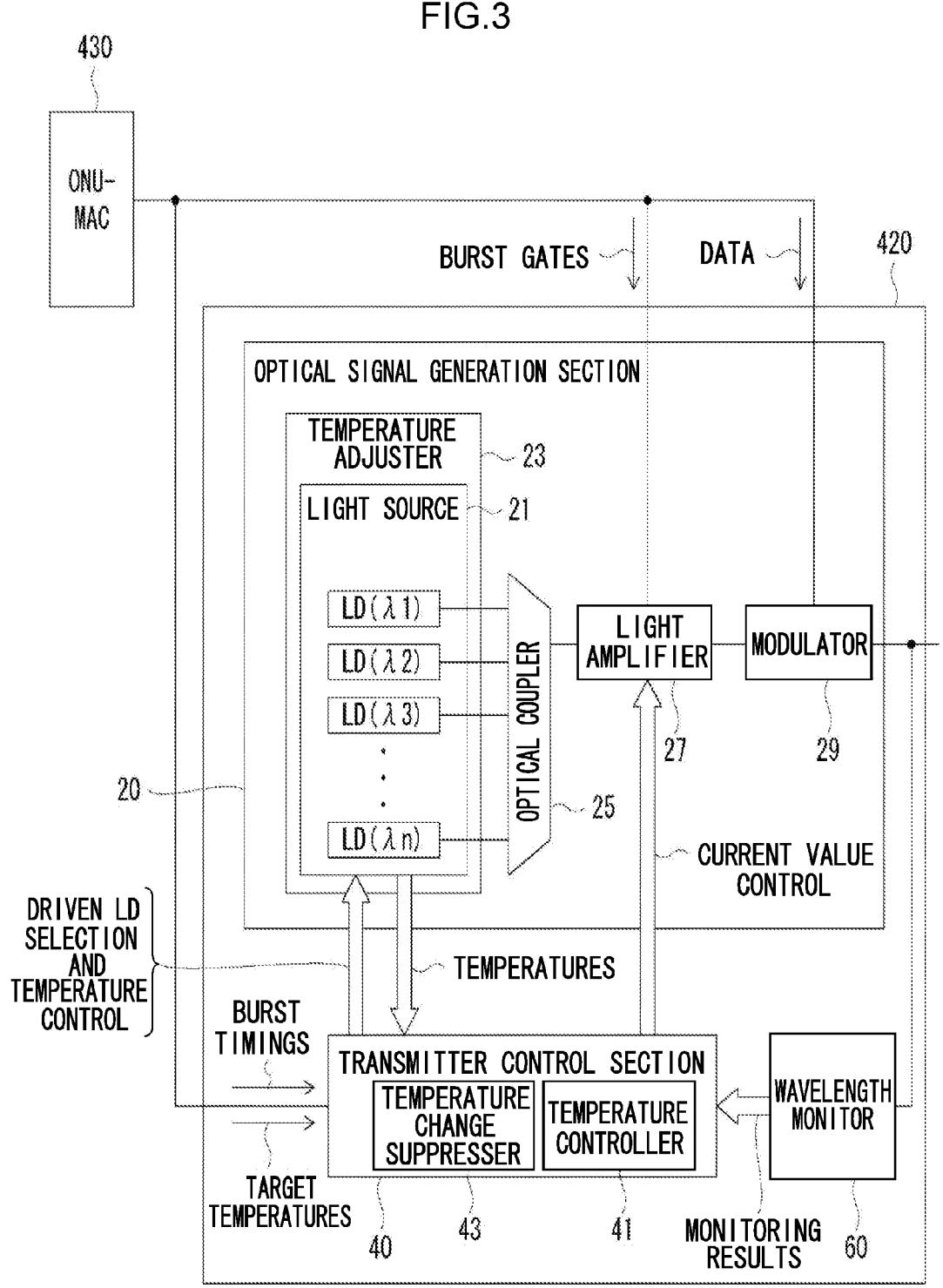
FIG. 3 is a schematic diagram of an optical transmitter in accordance with the present invention.

Referring to FIG. 3, an optical transmitter according to the present embodiment of the invention is described. FIG. 3 is a schematic diagram of the optical transmitter. This optical transmitter is incorporated in the ONU and serves as the optical transmission section mentioned above.

The optical transmission section 420 is provided with an optical signal generation section 20, a transmitter control section 40 and a wavelength monitor 60.

The optical signal generation section 20 includes a light source 21, a temperature adjuster 23, an optical coupler 25, a light amplifier 27 and a modulator 29.

A light source that is capable of generating light whose wavelength is selectively altered, such as, for example, an LD array, a distributed feedback (DFB) laser or the like, may be used as the light source 21. In FIG. 3, a configuration example is shown in which an LD array is used as the light source 21. Below, the case in which the light source 21 is the LD array is described. The light source 21 includes a plural number of LDs specified with respectively different wavelengths. In the light source 21, a single LD selected by a command from the transmitter control section 40 is driven to generate and output light. As mentioned above, the output light of the light source 21 is a continuous wave (CW).

The temperature adjuster 23 adjusts a temperature of the light source 21 on the basis of temperature information that is reported from the transmitter control section 40. For example, a TEC may be used as the temperature adjuster 23. The wavelength of the upstream optical signals is determined by the wavelength specified for the selected LD and temperature adjustment by the TEC.

The temperature adjuster 23 sends information on the temperature of the light source 21 to the transmitter control section 40.

The optical coupler 25 is connected with the respective LDs that structure the light source 21. The optical coupler 25 sends output light from the light source 21 to the light amplifier 27.

The light amplifier 27 generates burst signals by amplifying light that is generated by the light source and passed through the optical coupler 25. For example, an SOA may be used as the light amplifier 27.

The light amplifier 27 generates burst signals in accordance with the reception of burst gates that are sent from the ONU-MAC 430. Thus, times at which burst signals are to be received are used as burst signal generation timings (burst timings) by the light amplifier 27. A burst gate includes information on the duration of a burst signal that is to be generated. The light amplifier 27 receiving the burst gate turns on at the burst timing and amplifies the output light of the LD array. The light amplifier 27 turns off after a period corresponding to the duration of the burst signal that is to be generated. The burst signals are generated in bursts from the output light of the LD array by on/off operations of the light amplifier 27. The burst timings commanded by the ONU-MAC 430 are specified to correspond with burst signal reception timings specified by the OSU.

The modulator 29 modulates the burst signals generated by the light amplifier 27 with data sent from the ONU-MAC 430. The modulated burst signals are sent to the OSU.

The wavelength monitor 60 monitors wavelengths of the burst signals being outputted by the modulator 29. The wavelength monitor 60 reports information on the monitored wavelengths to the transmitter control section 40.

The transmitter control section 40 is structured by, for example, a central processing unit (CPU) and controls operations of the optical signal generation section 20. For example, in accordance with commands from the ONU-MAC 430, the transmitter control section 40 commands the light source 21 which single LD is to be driven. The transmitter control section 40 also controls current values at the light amplifier 27. The transmitter control section 40 receives information on the burst signal wavelengths that are monitored by the wavelength monitor 60.

Figure 4:
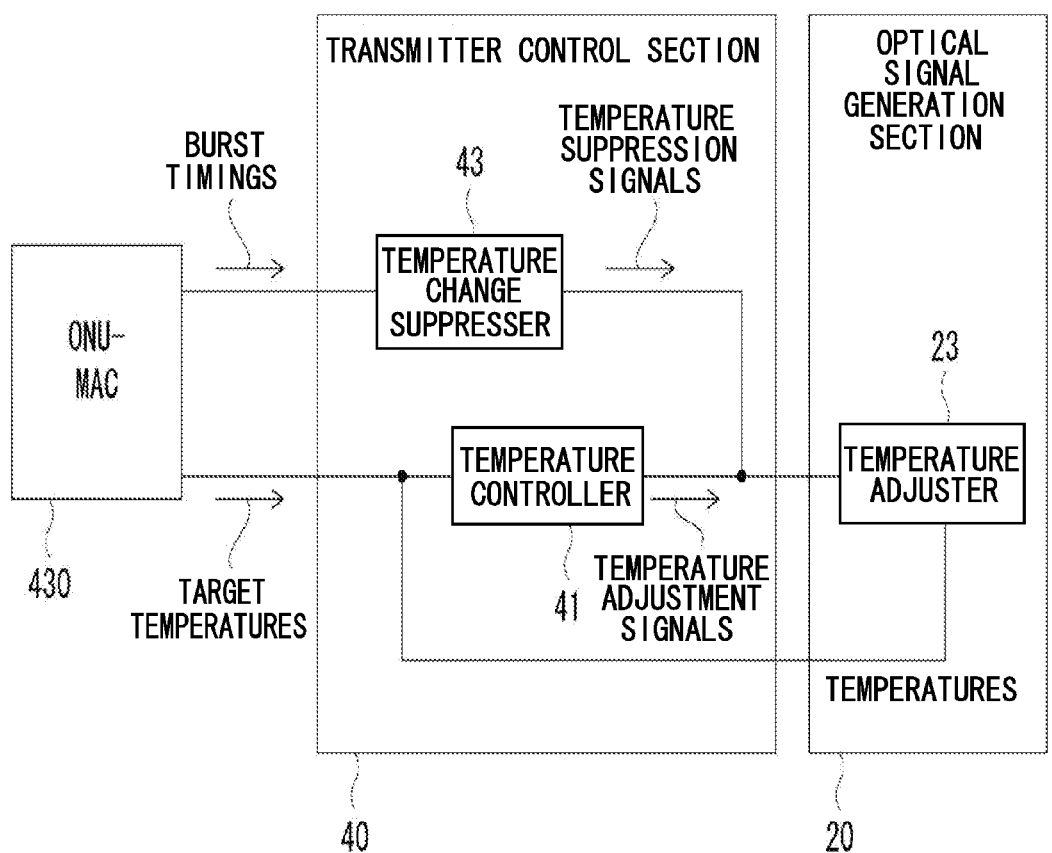
FIG. 4 is a schematic diagram of principal portions of an optical signal generation section and a transmitter control section with which the optical transmitter in accordance with the present invention is equipped.

The transmitter control section 40 serves as a function unit and includes a temperature controller 41 and a temperature change suppresser 43. The temperature controller 41 and the temperature change suppresser 43 are described with reference to FIG. 4. FIG. 4 is a diagram schematically showing principal portions of the optical signal generation section 20 and transmitter control section 40 provided at the optical transmission section 420.

The temperature controller 41 controls temperature adjustment by the temperature adjuster 23 by sending temperature adjustment signals to the temperature adjuster 23. The temperature adjustment signals include information on temperature adjustment amounts. A temperature adjustment amount is determined on the basis of a target temperature reported to the temperature controller 41 by the ONU-MAC 430 and a temperature of the light source 21 that is sent from the temperature adjuster 23. As a method for determining the temperature adjustment amounts, for example, proportional-integral-differential (PID) control may be used. In PID control, a difference between the target temperature and the temperature sent from the temperature adjuster 23 is multiplied with a proportional term, an integral term and a differential term to calculate the temperature adjustment amount. The temperature adjuster 23 receiving the temperature adjustment amounts brings the temperature of the light source 21 to the target temperature by performing temperature adjustments in accordance with the reported temperature adjustment amounts. The target temperature is specified by the ONU-MAC 430 in accordance with the transmission wavelength of the burst signals.

The temperature controller 41 receives information on the wavelengths of the burst signals that are monitored by the wavelength monitor 60. If a wavelength of the burst signals has deviated from the specified transmission wavelength, the temperature controller 41 controls the temperature adjuster 23 with temperature adjustment signals to correct the wavelength of the burst signals.

As mentioned above, a duration that the temperature adjuster 23 requires for temperature adjustment is short compared to the duration of a burst signal. Therefore, even if the temperature controller 41 controls the temperature adjuster 23 and starts temperature adjustment by the temperature adjuster 23 on the basis of temperature information sent from the temperature adjuster 23 and wavelength information sent from the wavelength monitor 60, a temperature change caused by the generation of a burst signal may not be dealt with.

Accordingly, in this embodiment, in order to suppress temperature changes caused by the generation of burst signals, the transmitter control section 40 includes the temperature change suppresser 43, which controls the temperature adjuster 23, separately from the temperature controller 41.

The temperature change suppresser 43 sends temperature suppression signals to the temperature adjuster 23. The temperature suppression signals include temperature suppression amounts to be reported to the temperature adjuster 23. The temperature suppression amounts are adjustment amounts for suppressing temperature changes of the light source 21 that are caused by burst signal generation at the light amplifier 27. The temperature suppression amounts are specified on the basis of prior measurements of temperature change amounts of the light source 21 that are caused by burst signal generation. For example, if a temperature change caused by burst signal generation would be +1° C., The temperature suppression amount is set to −1° C. The temperature adjuster 23 receiving a temperature suppression signal suppresses a temperature change caused by burst signal generation by adjusting the temperature in an amount corresponding to the temperature suppression amount in time for a burst timing.

A predetermined duration is required for this temperature adjustment by the temperature adjuster 23. Therefore, for the temperature change caused by the burst signal generation to be suppressed, the temperature adjuster 23 must start the temperature adjustment according to the temperature suppression amount before the burst timing. Accordingly, the temperature change suppresser 43 sends the temperature suppression signal to the temperature adjuster 23 taking account of the duration that the temperature adjuster 23 requires for the temperature adjustment. The temperature adjuster 23 receives the temperature suppression signal at least the duration that the temperature adjuster 23 requires for the temperature adjustment before the burst timing.

Figure 5:
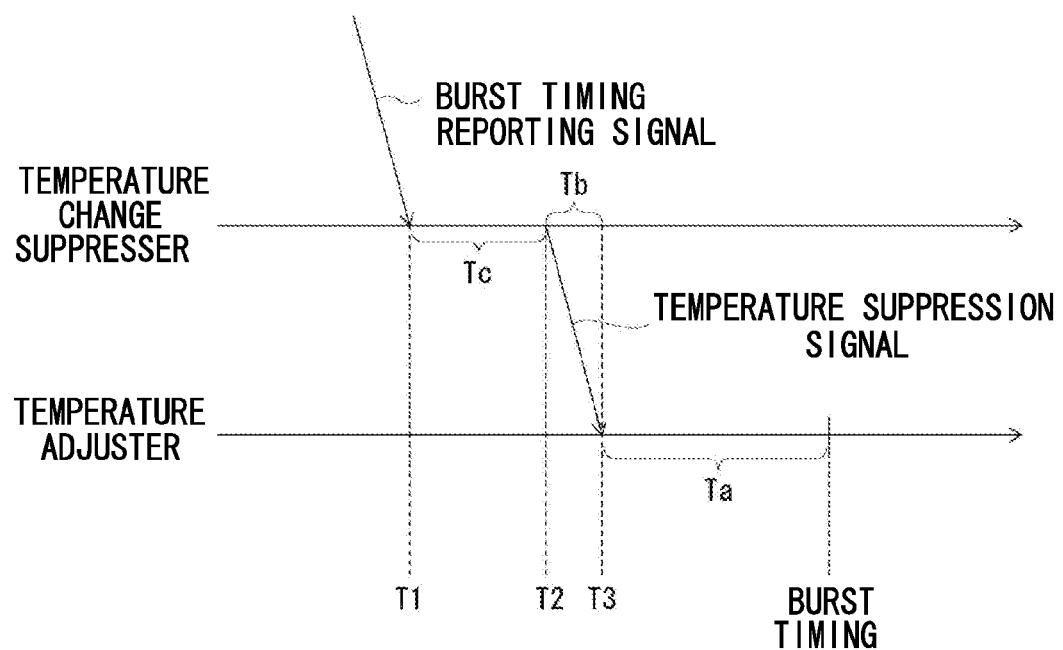
FIG. 5 is a timing chart for describing a transmission timing and reception timing of a temperature suppression signal in the optical transmitter in accordance with the present invention.

Referring to FIG. 5, a transmission timing of a temperature suppression signal by the temperature change suppresser 43 and a reception timing of the temperature suppression signal by the temperature adjuster 23 are described. FIG. 5 is a timing chart for describing the transmission timing and reception timing of the temperature suppression signal.

First, at time T1, the temperature change suppresser 43 receives a burst timing reporting signal from the ONU-MAC 430. The burst timing reporting signal includes information on a burst timing. The temperature change suppresser 43 receiving the burst timing reporting signal creates a temperature suppression signal.

Then, at time T2, the temperature change suppresser 43 sends the temperature suppression signal to the temperature adjuster 23. The temperature change suppresser 43 sends this temperature suppression signal before the reported burst timing by at least a duration Ta that is required for a temperature adjustment in an amount corresponding to the temperature suppression amount (a temperature adjustment duration). The temperature suppression duration Ta is specified in accordance with prior measurements. As well as the duration in which the temperature adjuster 23 actually adjusts the temperature, the temperature suppression duration Ta includes a duration from when the temperature adjuster 23 receives the temperature suppression signal until the start of the temperature adjustment, which is, for example, a duration required for preparation for the temperature adjustment and suchlike. The temperature change suppresser 43 transmits the temperature suppression signal taking further account of a very short duration Tb, which is a duration of the transfer of the temperature suppression signal from the temperature change suppresser 43 to the temperature adjuster 23 and suchlike. Therefore, the time T2 at which the temperature change suppresser 43 transmits the temperature suppression signal is a time calculated by subtracting the temperature suppression duration Ta and the very short duration Tb from the burst timing.

In FIG. 5, a duration Tc from time T1 to time T2 includes a duration that the temperature change suppresser 43 requires for creation of the temperature suppression signal, a waiting time until time T2 and suchlike. Hereinafter, the duration Tc is referred to as "the temperature suppression signal creation duration".

Then, at time T3, which is the temperature adjustment duration Ta before the burst timing, the temperature adjuster 23 receives the temperature suppression signal. The temperature adjuster 23 receiving the temperature suppression signal performs the temperature adjustment in the amount corresponding to the reported temperature suppression amount.

Because of this specification of the transmission timing of the temperature suppression signal by the temperature change suppresser 43 and the reception timing of the temperature suppression signal by the temperature adjuster 23, the temperature adjuster 23 completes the temperature adjustment to the amount corresponding to the temperature suppression amount at the burst timing. Consequently, a temperature change of the light source caused by the burst signal generation can be suppressed.

Figure 6A:
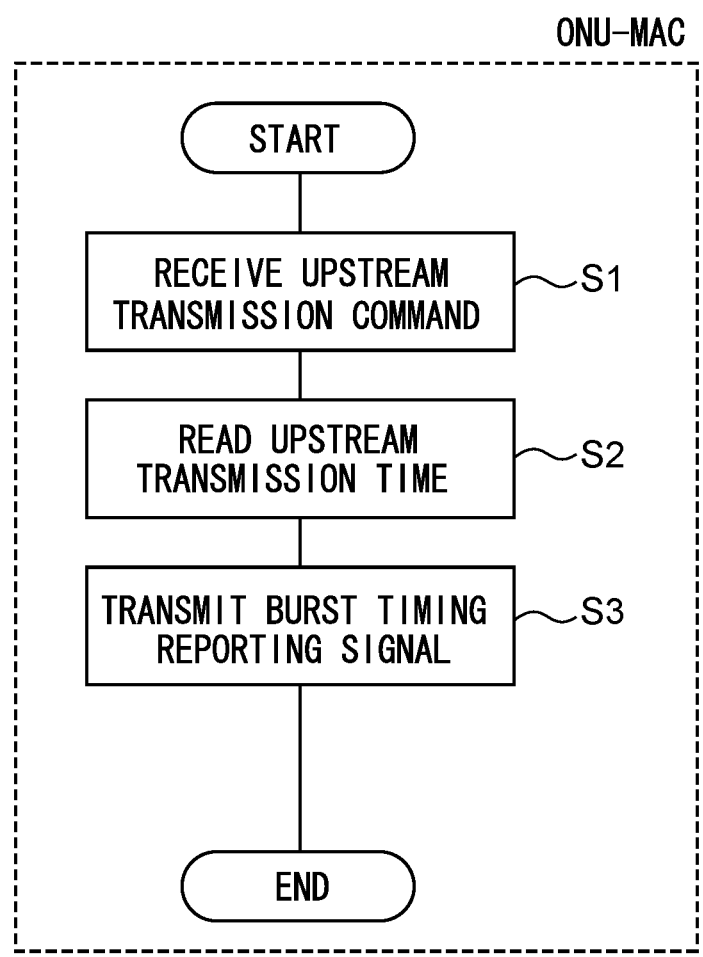
FIG. 6A is a flowchart depicting a processing flow until a temperature change suppresser of the optical transmitter in accordance with the present invention transmits a temperature suppression signal.
Figure 6B:
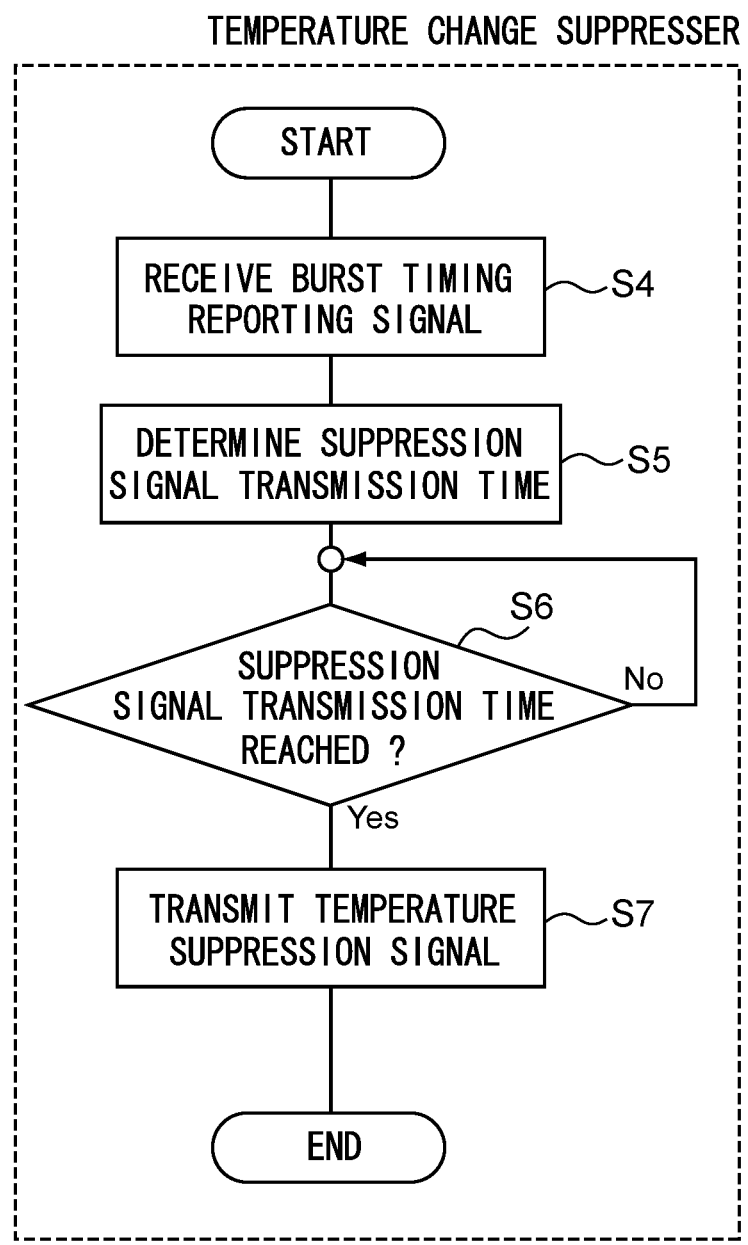
FIG. 6B is a flowchart depicting a processing flow until the temperature change suppresser of the optical transmitter in accordance with the present invention transmits the temperature suppression signal.

Referring to FIG. 6A and FIG. 6B, processing flows at the ONU-MAC and the temperature change suppresser until the temperature change suppresser transmits the temperature suppression signal at the above-described time T2 (see FIG. 5) are described. FIG. 6A and FIG. 6B are flowcharts depicting the processing flows until the temperature change suppresser transmits the temperature suppression signal. The processing flow shown in FIG. 6A is executed by the ONU-MAC. The processing flow shown in FIG. 6B is executed by the temperature change suppresser, continuing from the processing flow shown in FIG. 6A. At the time of the start of FIG. 6A, the ONU that includes the ONU-MAC executing the processing flow has already been registered at a particular OSU.

First, the processing flow executed by the ONU-MAC is described.

In S1, the ONU-MAC receives a transmission command sent from the OSU.

Then, in S2, the ONU-MAC reads a transmission time for an upstream optical signal (a burst signal) from the received transmission command.

In S3, the ONU-MAC transmits a burst timing reporting signal to the temperature change suppresser. The burst timing reporting signal includes information of a burst timing that corresponds to the transmission time commanded by the OSU.

A transmission timing of the burst timing reporting signal from the ONU-MAC is specified such that the temperature change suppresser may transmit the temperature suppression signal at the above-described time T2 (see FIG. 5). Accordingly, the transmission timing of the burst timing reporting signal is specified to be before the burst timing by at least a duration calculated by adding the very short duration Tb and the temperature suppression signal creation duration Tc described above to the temperature adjustment duration Ta. The temperature adjustment duration Ta and the very short duration Tb and temperature suppression signal creation duration Tc described above are specified in accordance with prior measurements.

The ONU-MAC calculates transmission timings for burst timing reporting signals when the system is started up. Hence, the ONU-MAC re-calculates transmission timings for burst timing reporting signals when, for example, the OSU that is administering the ONU changes and the transmission wavelength of the burst signals changes.

After the ONU-MAC transmits the burst timing reporting signal, the ONU-MAC ends the processing flow shown in FIG. 6A. After the end of this processing flow, the ONU-MAC sends a burst gate to the light amplifier at a timing that corresponds to the transmission time commanded by the OSU. The time at which the light amplifier receives the burst gate is the burst timing.

Now, the processing flow executed by the temperature change suppresser is described.

In S4, the temperature change suppresser receives the burst timing reporting signal sent from the ONU-MAC. The temperature change suppresser receiving the burst timing reporting signal reads the burst timing that is included in the burst timing reporting signal.

Then, in S5, the temperature change suppresser determines the transmission time of the temperature suppression signal in accordance with the burst timing. The temperature change suppresser determines a time calculated by subtracting the temperature adjustment duration Ta and the very short duration Tb (see FIG. 5) from the burst timing to be the transmission time of the temperature suppression signal. The temperature change suppresser completes the creation of the temperature suppression signal before the determined transmission time of the temperature suppression signal.

In S6, the temperature change suppresser waits until the transmission time of the temperature suppression signal. The temperature change suppresser continues to wait ("No" in S6) until the transmission time of the temperature suppression signal is reached. When the transmission time of the temperature suppression signal is reached ("Yes" in S6), the temperature change suppresser proceeds to S7 and transmits the temperature suppression signal to the temperature adjuster.

After the temperature change suppresser transmits the temperature suppression signal, the temperature change suppresser ends the processing flow shown in FIG. 6B.

Because the ONU-MAC and the temperature change suppresser execute the processing flows shown in FIG. 6A and FIG. 6B described above, the temperature change suppresser transmits the temperature suppression signal to the temperature adjuster at time T2 shown in FIG. 5. As a result, the temperature adjuster may receive the temperature suppression signal at a time that is the temperature suppression duration Ta before the burst timing.

A period for which the light amplifier performs On operations changes in accordance with the duration of a burst signal that is being generated. Therefore, it is likely that a temperature change amount of the light source caused by burst signal generation changes in accordance with the duration of the burst signal.

Accordingly, in this embodiment, a temperature suppression amount that the temperature change suppresser reports to the temperature adjuster may be adjusted in accordance with the duration of the burst signal.

In this case, the ONU-MAC adds information on the duration of the burst signal to the burst timing reporting signal and sends the same to the temperature change suppresser. The temperature change suppresser receiving the burst timing reporting signal adjusts the temperature suppression amount in accordance with the reported duration of the burst signal. The temperature change suppresser reports the adjusted temperature suppression amount to the temperature adjuster with the temperature suppression signal. Consequently, a temperature change of the light source may be suppressed in accordance with both the burst timing and the burst signal duration.

Figure 7A:
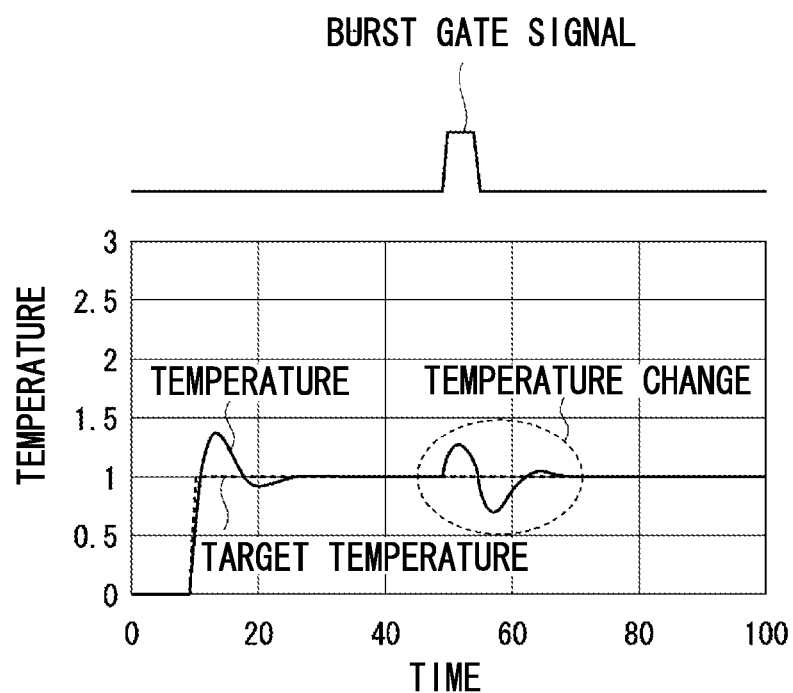
FIG. 7A is a diagram illustrating results of a simulation evaluating characteristics of the optical transmitter in accordance with the present invention.
Figure 7B:
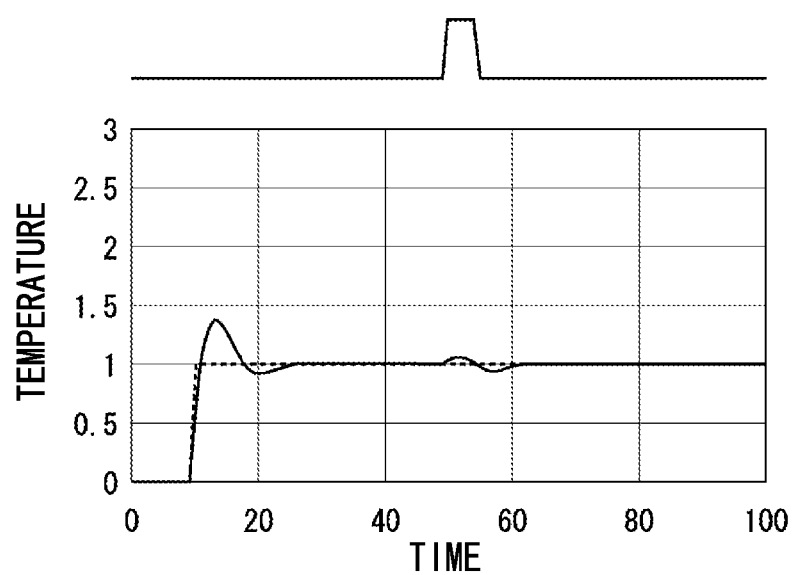
FIG. 7B is a diagram illustrating the results of the simulation evaluating characteristics of the optical transmitter in accordance with the present invention.

The inventors have conducted a simulation evaluating characteristics of an optical transmitter according to the embodiment. In this simulation, the temperature of the light source at a time at which the light amplifier receives a burst gate (a burst timing) was verified. Results of the simulation are described with reference to FIG. 7A and FIG. 7B. FIG. 7A and FIG. 7B are diagrams showing results of the simulation, with the vertical axis showing temperature and the horizontal axis showing time in respective arbitrary units. FIG. 7A shows temperature changes of a light source in an optical transmitter with a conventional configuration, which are results of a simulation for comparison. FIG. 7B shows temperature changes in the light source of the optical transmitter according to the embodiment described above.

As shown in FIG. 7A, in the conventional optical transmitter, there is a change in the temperature of the light source at the burst timing. In contrast, as shown in FIG. 7B, in the optical transmitter according to the embodiment, a temperature change of the light source at the burst timing is suppressed compared to the conventional optical transmitter. From these results, it was verified that the temperature of the light source at the burst timing may be suppressed in the optical transmitter according to this embodiment.

What is claimed is:

1. An optical transmitter to be used as an optical transmission section at a subscriber side device used in an optical access network, the optical transmitter comprising:
   an optical signal generation section and a transmitter control section, wherein:
      the optical signal generation section includes:
         a light source;
         a temperature adjuster that adjusts a temperature of the light source; and
         a light amplifier that amplifies light generated by the light source and
      generates burst signals;
      the transmitter control section includes a temperature change suppresser that sends a temperature suppression signal to the temperature adjuster, the temperature suppression signal reporting a temperature suppression amount that is to suppress a temperature change of the light source caused by burst signal generation at the light amplifier; and
      the temperature adjuster receives the temperature suppression signal at least a duration that the temperature adjuster requires for temperature adjustment before a timing at which the light amplifier is to generate a burst signal.

2. A subscriber side device comprising the optical transmitter according to claim 1 and an ONU-MAC, wherein:
   the ONU-MAC sends a burst timing reporting signal to the temperature change suppresser, the burst timing reporting signal reporting a timing at which the light amplifier is to generate a burst signal, and the temperature change suppresser receiving the burst timing reporting signal determines a time at which to send the temperature suppression signal to the temperature adjuster on the basis of the timing at which the light amplifier is to generate the burst signal that is reported by the burst timing reporting signal.

3. A light source temperature change suppression method that utilizes the optical transmitter according to claim 1, the method comprising:

at the temperature change suppresser, sending the temperature suppression signal to the temperature adjuster, the temperature suppression signal reporting the temperature suppression amount that is to suppress a temperature change of the light source caused by burst signal generation at the light amplifier; and at the temperature adjuster, receiving the temperature suppression signal at least as long as the temperature adjuster requires for temperature adjustment before the timing at which the light amplifier is to generate the burst signal.

4. A light source temperature change suppression method that utilizes the subscriber side device according to claim 2, the method comprising:

at the ONU-MAC, sending the burst timing reporting signal to the temperature change suppresser, the burst timing reporting signal reporting the timing at which the light amplifier is to generate the burst signal; and at the temperature change suppresser that has received the burst timing reporting signal, determining a time at which to send the temperature suppression signal to the temperature adjuster on the basis of the timing at which the light amplifier is to generate the burst signal that has been reported by the burst timing reporting signal.

* * * * *